United States Patent [19]

Painton et al.

[11] Patent Number: 4,717,968
[45] Date of Patent: Jan. 5, 1988

[54] VIDEO PLAYER WITH POWER-DOWN CAPABILITY

[75] Inventors: Richard C. Painton, Webster; Jay D. Marchetti, Rochester; John J. Acello, East Rochester; John J. Bradley, Rochester; Richard H. Bolton, East Rochester, all of N.Y.

[73] Assignee: Eastman Kodak Company, Rochester, N.Y.

[21] Appl. No.: 776,239

[22] Filed: Sep. 16, 1985

[51] Int. Cl.$^4$ ............................................. H04N 5/781
[52] U.S. Cl. .................................... 358/310; 358/342; 360/10.1; 360/35.1; 360/69; 360/74.1; 369/33
[58] Field of Search ............... 358/335, 342, 906, 310; 360/10.1, 35.1, 55, 69, 74.1, 74.4, 75, 105; 369/19, 33

[56] References Cited

U.S. PATENT DOCUMENTS

| | | | |
|---|---|---|---|
| 4,120,010 | 10/1978 | Mitsuya et al. | 360/75 |
| 4,470,076 | 9/1984 | Arai et al. | 360/35.1 |
| 4,556,919 | 12/1985 | Fujibayashi | 360/74.1 |
| 4,635,145 | 1/1987 | Horie et al. | 360/75 X |

FOREIGN PATENT DOCUMENTS 127266 7/1984 Japan .

OTHER PUBLICATIONS

IEEE Transactions on Consumer Electronics Kihara et al., vol. CE-28, No. 3, pp. 325–330, 8/82.
User's Manual Iomega Cartridge Disk Subsystem, 7/84.

Primary Examiner—Robert L. Richardson
Attorney, Agent, or Firm—David M. Woods

[57] ABSTRACT

A video player includes a playback head that repeatedly passes in contact with a circular track on a flexible magnetic disk in order to reproduce a still picture on a video display. By cycling the player into a special quiescent state after a certain interval elapses without user instructions, excessive disk wear is avoided. While in the quiescent state, the disk drive motor is stopped—immobilizing the disk-to-head interface—and the video display is blanked. If user instructions are received while in this state, the disk drive motor is reenergized and the video display is resumed, showing the still picture displayed prior to interruption. If no user instructions are received during a further interval, the player is shut off.

15 Claims, 5 Drawing Figures

VIDEO PLAYER WITH POWER-DOWN CAPABILITY

BACKGROUND OF THE INVENTION

1. Field of the Invention

This invention pertains to video apparatus of the type that processes signals representative of a still picture recorded on a magnetic medium. More particularly, the invention relates to a video player that reproduces a still picture by repeatedly transversing a circular track on a magnetic disk.

2. Description Relative to the Prior Art

Video apparatus according to this invention utilizes a magnetic disk having a flexible recording member on which a picture is recorded as one field of a composite color video signal. A disk ordinarily contains many pictures recorded on separate tracks. Each picture may be put on the isk by a video still camera employing an electronic imager to capture an image of the still picture. A recording circuit in the camera transfers, for each picture, the contents of the imager to the magnetic disk as, for example, a circular record track containing one video field.

The recorded disk is removed from the camera and inserted into a video player to reproduce each recorded field as a visible picture. A disk drive motor in the player rapidly rotates the magnetic disk at an angular velocity of 3600 r.p.m., which corresponds to the repetition frequency of a television field. Each revolution of the disk thus generates a playback signal having the correct field rate for NTSC reproduction. To complete a video frame, the player forms a second field from a second pass over the recorded field and interlaces the two fields for reproduction on a video display. Since the display time for a complete frame is one-thirtieth of a second, the player must repeatedly cycle the same video frame to the display (one minute of viewing, for example, corresponds to 3600 passes over the recorded track). U.S. Pat. No. 4,470,076 describes a player of this type, that is, one that presumes continued passage over a single track for continued viewing of a single picture.

Such continued passage, however, is not without its problems. The recording member includes a magnetic coating on a flexible substrate. A playback head (as well as a record head) must remain in intimate contact with the surface of this type of disk for effective playback (or recording). Too much contact pressure between the head and the disk can quickly scrape the track clear of the magnetic coating and ruin the disk. Too little contact pressure results in an unstable interface and consequently degrades signal output. The disk-to-head contact, therefore, is ordinarily stabilized with minimum contact pressure by using such assists as a grooved guide plate to aerodynamically, and gently, urge the disk to the head. Nonetheless, continued passage of the head over the same track will apply enough stress and wear to the magnetic coating to eventually change its magnetic properties and thereby reduce signal output (a phenomenon called the Villari effect).

Clearly, a compromise is made between contact pressure and the useable life of the disk. The compromise, unfortunately, often dictates a rather short life. Some published work by Sony Corporation shows that after 24 hours of playback over the same track, the signal output has declined about one dB, a figure found to be acceptable by the Sony authors (see "The Electronic Still Camera A New Concept in Photography," by N. Kihara et al, *IEEE Transactions on Consumer Electronics,* Vol. CE-28, No. 3, Aug. 1982, pp. 325–330). The Sony publication, while not drawing an outright conclusion about performance after 24 hours of use, shows signal output dropping even further. A 0.5 to 1.0 dB additional signal loss is about all that can be tolerated in a commercial system (considering that a total loss of 3 db would mean half the signal power is lost).

Faced with the likelihood of a serious wear problem developing after 24 hours of use on one track, it is imperative that disk-to-head contact be kept to a useful minimum—useful in the sense that such apparatus is in fact being used during the period of disk-to-head contact. For example, if for some reason the user should leave the player—say to answer the telephone—the disk-to-head contact is no longer serving a useful purpose. It is also likely that the player could be left on through forgetfulness or inattention. Whatever is done to alleviate wear should place little or no demand on the user. The user may feel obliged to answer the telephone but cannot be expected to intervene on behalf of the player anymore than for an ordinary television—which is usually left unattended and operating in such situations.

SUMMARY OF THE INVENTION

The invention treats the problem of minimizing disk wear without intervention from the user by cycling the apparatus into a special quiescent state in which the disk is stopped after a certain interval without user input. Even though disk-to-head contact may be maintained (which is optional), disk wear is minimized since the disk is immobilized with respect to the head. Any subsequent user input within a further interval (that of the quiescent state) causes the apparatus to resume operation with the same track being accessed as prior to entering the quiescent state. After the quiescent interval elapses without user input, the apparatus shuts off. In the quiescent state, and until the user reactivates the apparatus, the apparatus remains mostly powered except for the disk drive. This not only ensures a quick and simple reactivation but permits a more "hospitable" user environment. For example, in the case of a player, the display screen is blanked so as to keep the partial shutdown as inconspicious as possible.

A video player according to an embodiment of the invention produces still pictures on a video display depending on user selections entered from a control unit. A signal processing circuit included in the player operates in two modes. In its first mode, a playback signal recovered from the disk is converted into a first video signal for displaying a still picture on the display. In its second mode, a second video signal is generated for displaying some predetermined image (e.g., a blank screen) on the display in lieu of the still picture. A system controller in the player includes timing means for generating a power-down signal after a predetermined interval elapses without any selections from the control unit. Means responsive to the power-down signal inactivates the drive motor that rotates the disk and instructs the signal processing circuit to enter the second mode and route the second video signal to the display. Thereupon the disk comes to a stop and the display is blanked. The player then assumes a quiescent state in which it is still responsive to selections from the user. A selection made by the user during the quiescent state will reactivate the drive motor, thereby regenerating a playback signal, and instruct the signal processing circuit to return to the first mode and route the first video signal—the picture—to the display.

BRIEF DESCRIPTION OF THE DRAWINGS

The invention will be described with reference to the drawings, in which.

DETAILED DESCRIPTION OF THE PREFERRED EMBODIMENT

Figure 1:
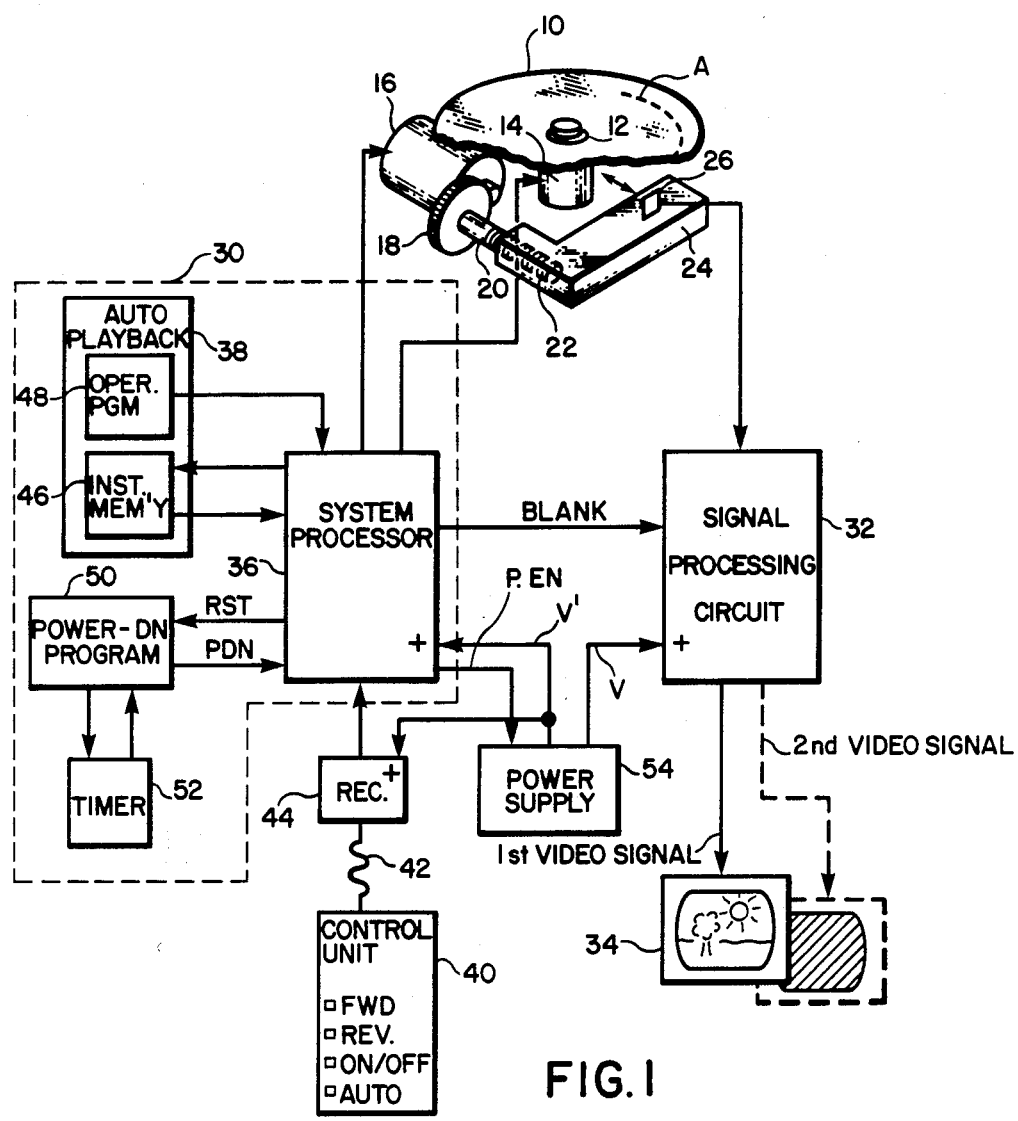
FIG. 1 is a block diagram showing a video disk player arranged according to the invention.

FIG. 1 shows a general diagram of a video disk player incorporating a quiescent state and auxiliary features according to the invention. A magnetic disk 10 is attached by its hub 12 to a disk drive motor 14. A stepper motor 16 is connected by a reduction gear 18 to a lead screw 20, which mates with a threaded hole 22 in a non-rotatable head block 24. A playback head 26 is mounted on the head block 24. The head block 24 is supported for movement radially of the disk 10 so that the playback head 26 may be positioned in contact with a selected track on the disk 10, such as a magnetic track A.

The player includes a system controller 30 (enclosed by broken lines) and a signal processing circuit 32. The primary function of the player is to reproduce a playback signal from the selected magnetic track A and to generate from that a video signal suitable for displaying a selected still picture (corresponding to the playback signal) on a video display 34. For purposes of this invention, the signal processing circuit 32 operates in two modes: in the first mode the circuit 32 responds to the playback signal sensed by the playback head 26 and produces a first video signal for displaying the selected still picture on the video display 34; in the second mode it responds to a control signal (BLANK) and produces a second video signal for displaying some predetermined image—normally that of a blank screen—in lieu of the still picture. (The first mode is depicted in FIG. 1 by the display 34 being in solid line and its connection to the circuit 32 also in solid line; the alternative second mode is shown by broken line, both as to the same display 34 and its connection to the circuit 32.)

The positioning of the head 26 in correspondence with the selected track A and the rotation of the disk 10 are controlled by the system controller 30. A system processor 36, residing in the system controller 30, responds to selection instructions from an automatic playback section 38 and from a control unit 40, which is the user interface with the player. The user turns the player on or off and controls the order of picture viewing (by forward and reverse buttons) from the control unit 40. As shown here, the control unit 40 emits a coded infrared signal 42, which is received by an IR receiver 44 and transmitted to the system processor 36. An arrangement for automatically viewing the pictures on the disk 10, for example, as to the order or the time allotted for displaying each picture, is entered via the control unit 40 to an instruction memory 46 in the automatic playback section 38. When automatic playback is selected, the prearranged instructions in the instruction memory 46 determine the arrangement of playback according to an operating program 48. (More entry buttons, or dual functions for the existing buttons, may be desirable on the control unit 40 for specifying and entering the arrangement for automatic playback).

The player is put into a quiescent state according to the invention upon receipt of a power-down signal PDN from a power-down program 50. The signal PDN is generated after a timer 52 indicates the elapse of a predetermined interval of time (the play interval) without the system processor 36 receiving any selections from the control unit 40 or instructions from the automatic playback section 38. Should the processor 36 receive a selection (or automatic instruction) before the signal PDN is generated, it sends a reset signal RST to restart the timer 52, which again starts counting from the beginning of the play interval. The play interval is set to such a time, say five minutes, that only in rare situations would no selection (or instruction) be received while a user is actually viewing a set of pictures. Ordinarily, then, the quiescent state would never be invoked during use of the player, and the user would go through the pictures unaware of the continuously resetting timer 52.

On the other hand, if no selection (or instruction) is received during the play interval, and the power-down signal PDN is generated, the system processor 36 inactivates the drive motor 14 and sends the blanking signal BLANK to the signal processing circuit 32. The signal BLANK instructs the signal processing circuit to enter its second mode and produce the second video signal, a picture blanking signal, for the display 34. Meanwhile the drive motor 14 comes to a stop, the disk 10 therewith, and the head 26 no longer generates a playback signal. Importantly, the head 26—though still adjacent the surface of the disk 10—is no longer traversing the track A and stressing, or even wearing away, the magnetic material. In addition, instead of showing an unappealing, noisy raster, the display 34 shows a blank (black) screen, or any other image desired (for example, from a text generator).

Once the system processor 36 puts the player into the quiescent state due to receipt of the power-down signal PDN, the system processor 36 immediately sends the signal RST to restart the timer 52. The timer 52 proceeds to count until a second predetermined interval of time (the quiescent interval) has elapsed. Should a selection from the control unit 40 (or an instruction from the auto playback section 38) be received before the second interval has elapsed, the system processor 36 energizes the drive motor 14 and deactivates the blanking signal BLANK. The circuit 32 then reverts to its first mode during which its sends the first video signal to the display 34 and shows the selected still picture from the track A. At the same time the timer 52 is reset and starts counting again (toward the elapse of the play interval). The quiescent interval is set to a suitably long time, say one hour, during which the user has an opportunity to resume viewing at the point of interruption.

If, however, the end of the quiescent interval is reached without receipt of a selection (or an instruction), the player is put into a semi-powered shutdown in which most, but not all, of the player is deenergized. For this reason a power supply 54 is provided having two powered modes: a playback mode and an off mode. In the playback mode both power lines V and V' are energized, providing power to the system controller 30 and to the signal processing circuit 32, thereby effecting playback. The power supply 54 is put into the off mode upon receipt of a disable signal P.EN from the system processor 36 (after the quiescent interval has run out). The power supply 54 responds to the signal P.EN by deenergizing the line V, leaving energized only the power line V'. The energized line V' is connected to the receiver 44 and to the processor 36 to interpret and act upon an on/off signal from the control unit 40 via the receiver 44. This means that all parts of the player are deenergized except those parts necessary to restart the player if the on/off button is actuated from the control unit 40.

Figure 4:
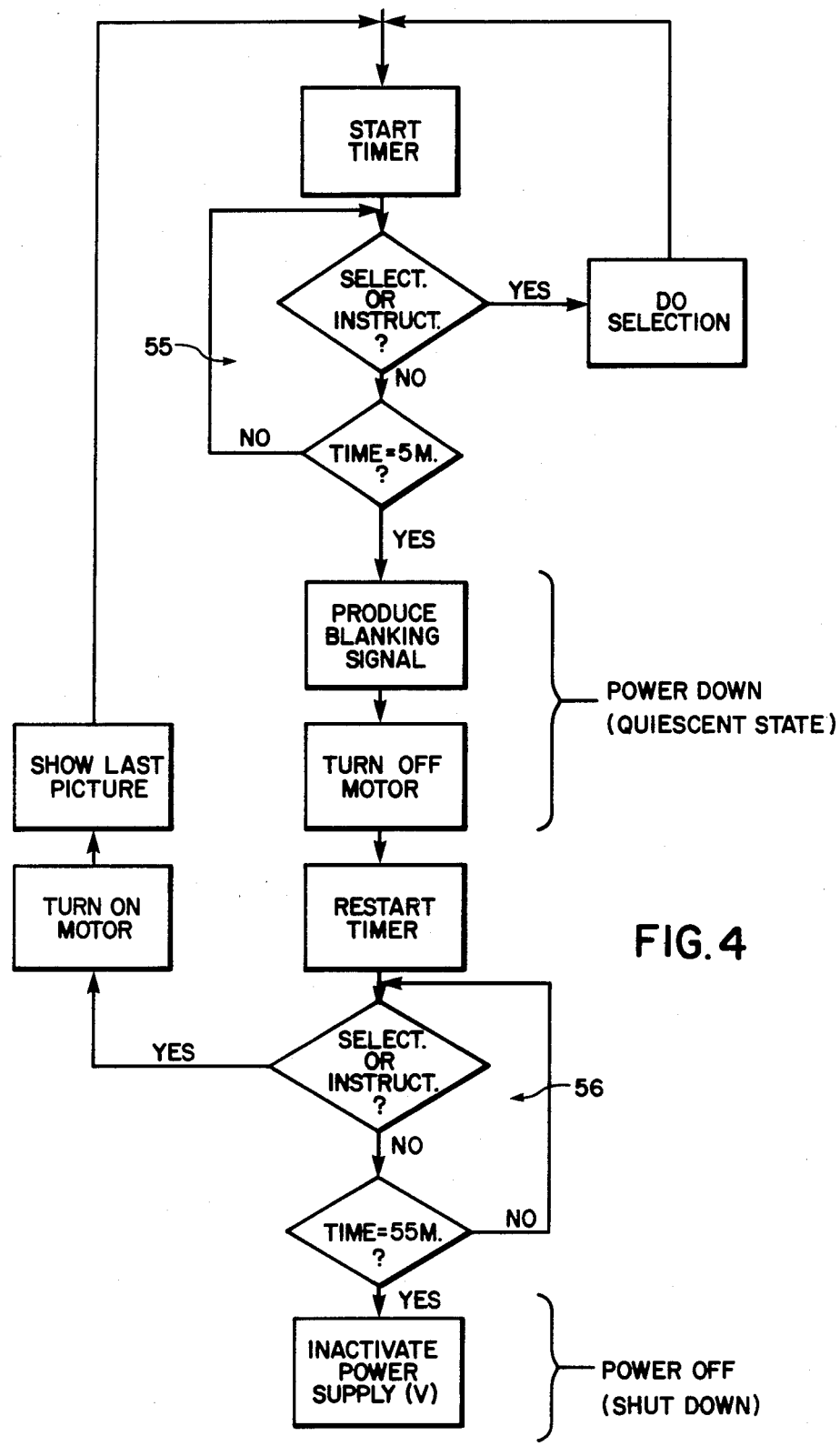
FIG. 4 is a functional flow diagram for a computer program that may be used with the system controller of FIGS. 1, 2 and 3 to place the player in a quiescent state.

The functional routine for putting the player into the quiescent state, and then into shutdown, is shown by the flow diagram of FIG. 4. For the example shown, the first predetermined interval (play interval) is 5 minutes and the second predetermined interval (quiescent interval) is 55 minutes. The timer 52 is shown in its preferred form as software timing routines 55 and 56. These timing routines are interrupted by a selection (or an instruction) and the flow reverts back to the beginning of the diagram. If 5 minutes run out before a new selection is entered, the display is blanked and the drive motor stops. Then, if 55 more minutes run out without any selection, the player is turned off. Thereafter, the player only responds to the on/off selection from the control unit. However, any selection (forward, reverse, etc.) other than "on/off" during the 55 minutes of the quiescent interval turns the drive motor on and returns the last picture to the display. (Depressing the "on/off" button puts the player into the semi-powered shutdown mode.) The user, in effect, always picks up where viewing left off regardless of the button pushed (except the "on/off" button); thereafter the buttons resume their normal functions and other pictures may be displayed.

Figure 2A:
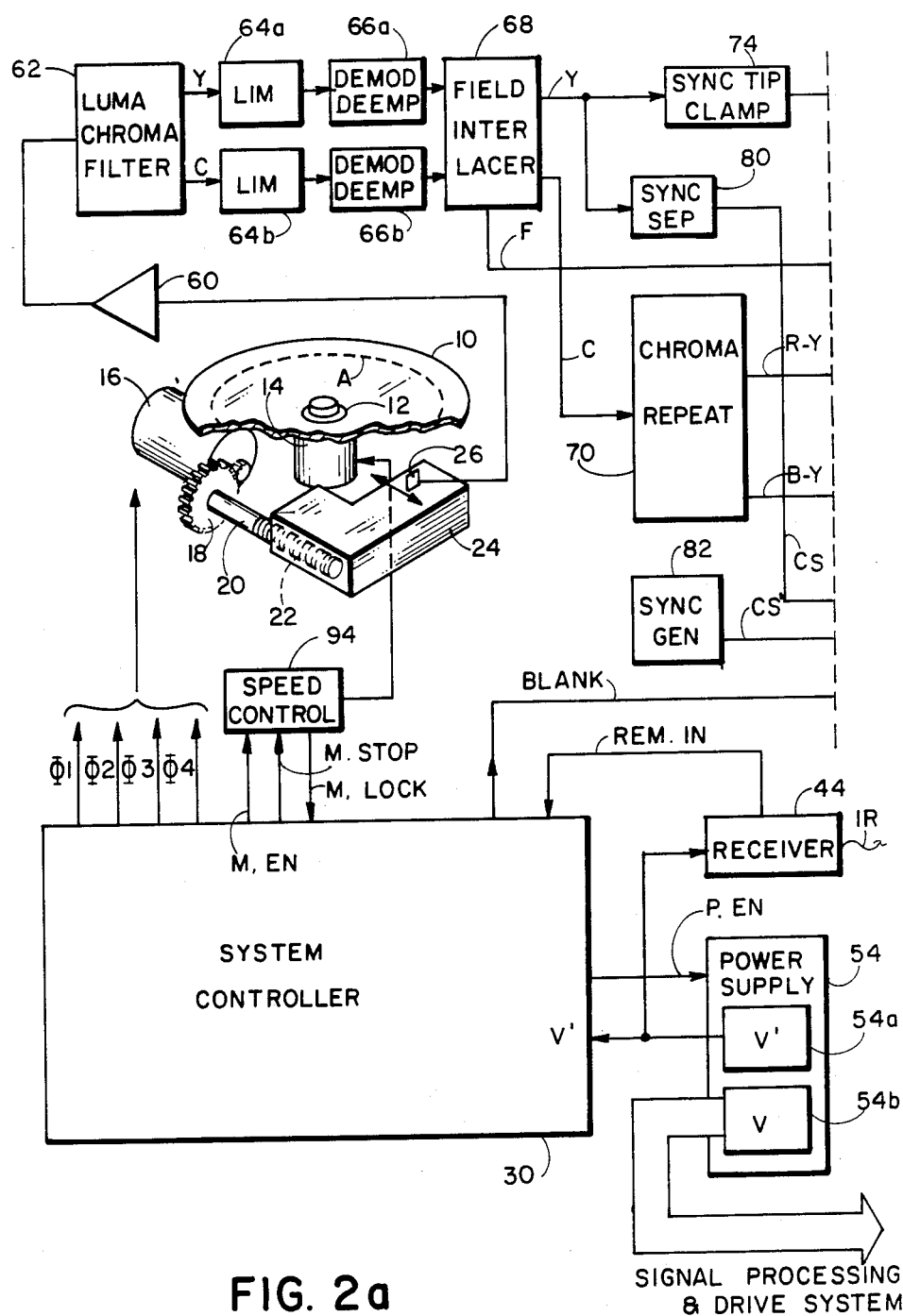
FIGS. 2a and 2b are diagrams elaborating in particular upon the system controller and signal processing blocks shown by FIG. 1.
Figure 2B:
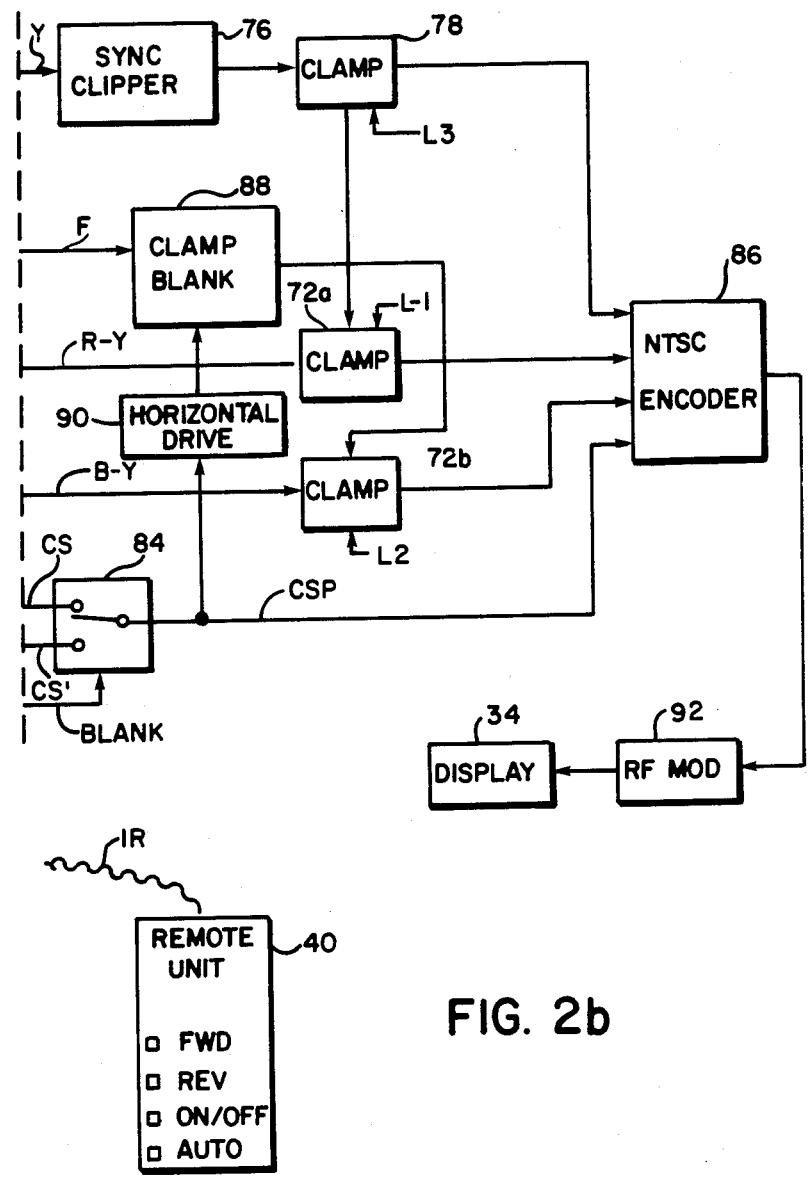
Figure 3:
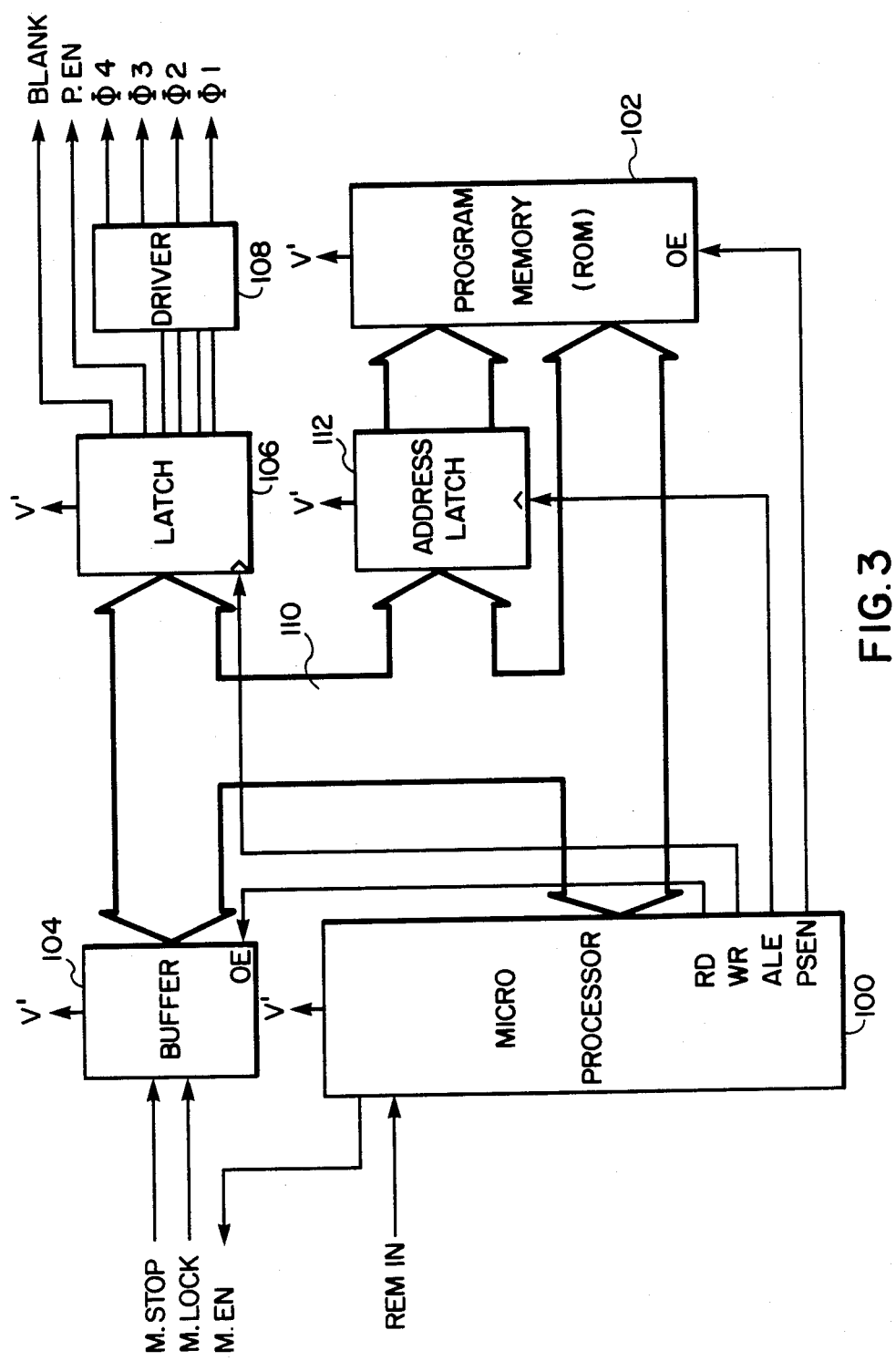
FIG. 3 is a diagram showing more detail of the system controller.

FIGS. 2a and b taken together are a generally more detailed diagram of the player, and in particular of the signal processing circuit 32; FIG. 3 shows more detail of the system controller 30, which appears in both FIGS. 1 and 2a. Components already discussed in connection with FIG. 1 are given like-numbered reference characters. The playback signal generated by the playback head 26 is, in the preferred embodiment, a low-level, line sequential fm signal which is provided to the input terminals of a preamplifier and equalization circuit 60. Rf equalization compensates for distortion present in the output voltage from the playback head. The output voltage from the preamplifier and equalization circuit 60 is fed to a separation filter 62 for separating the luminance (Y) and chrominance (C) signals from the playback signal. The separate Y and C signals are applied to respective limiters 64a and 64b in order to eliminate amplitude fluctuations. The limited Y and C fm signals are demodulated in respective circuits 66a and 66b, which also attenuate the higher frequencies (deemphasis) according to the amount that they were intentionally boosted at recording. It should be recalled that the signal recorded on the disk 10 (track A) represents one field of a television signal. In order to provide a full-frame signal, the demodulated Y and C signals are applied to a field interlacer 68. As is conventional, the interlacer 68 internally switches between two signal paths: one path directly passes the signals through for one field; the other path includes a 0.5 H delay and provides the interlaced field. The luminance signal Y for adjacent lines of the recorded field may be averaged to generate the luminance of each line of the interlaced field. Ordinarily the chrominance for the interlaced field is just a repeat of the recorded field.

Since the signal from the disk is line-sequential (that is, a pair of color difference signals alternate from line to line), it is necessary to store the color difference signal from each line and repeat it for the next line so that both color difference signals are available for subsequent processing. Such a store and repeat operation is performed by a chroma repeater 70. The color difference signals R-Y and B-Y are then applied to respective clamps 72a and 72b for establishing appropriate dc levels. Meanwhile the tips of the synchronization portion of the luminance signal Y are clamped in a sync tip clamp 74 and then clipped off the signal in a sync clipper 76 (an operation that is desirable for subsequent encoding). The clipped luminance signal is then clamped to an appropriate dc level in a clamp 78. As will be shown, the clamps 72a, 72b and 78 operate on their respective signals whether the player is receiving a playback signal from the disk 10 or is in the quiescent state (and the disk 10 is stopped).

A playback synchronization signal CS is provided by a synchronization separator 80 connected into the path of the Y signal. Alternatively a synchronization signal CS' is locally-generated by a free-running sync generator 82 and used during the quiescent state to stabilize the picture on the display 34. Both sync signals are applied to the input terminals of a switch 84; its output signal is a composite sync signal CSP necessary for proper generation of an NTSC encoded signal in an encoder 86. The switch 84 is operated according to the condition of the signal BLANK (also described in connection with FIG. 1) received from the system controller 30. The signal BLANK changes state—and toggles the switch 84—whenever the head 26 is moving between tracks or when the disk 10 is not rotating (the quiescent state). This invention is especially concerned with the latter occurrence. When the signal BLANK is high because the motor 14 is off (or the head is between tracks) the switch 84 conducts the locally-generated sync signal CS' through to the encoder 86 (as the playback sync signal CSP). At other times, when the signal BLANK is low, the switch 84 conducts the playback synchronization signal CS through to the encoder 86 (as the playback sync signal CSP).

The clamps 72a, 72b and 78 operate concurrently with the proper sync signal to clamp the color difference signals R-Y and B-Y and the luminance signal Y at correct dc levels for the encoder 86. The clamps are operated at selected dc levels L1, L2 and L3 by clamp and blank logic 88 during a substantial portion—preferably all—of the horizontal drive interval. Since the sync signals exist only for a short time at the beginning of the drive interval, a suitably long triggering pulse for the logic 88 is generated from the sync signal CSP by a horizontal drive generator 90. The logic 88 also needs to recognize the presence of the 0.5 H delayed interlace field in order to correctly time the clamps; this is done by a signal F from the field interlacer 68. The clamped luminance and color difference signals are formulated into an NTSC signal by the encoder 86 in relation to timing information provided by the playback sync signal CSP. The encoded video signal is converted into a radio frequency signal by an rf modulator 92 and sent to the video display 34.

The player is controlled according to user demands by the system controller 30. User selections are entered through the hand-held remote unit 40, which has its own battery power source. The remote unit 40 includes an infra-red transmitter, which generates a coded infra-red signal IR that radiates through space to the receiver 44. The receiver 44 decodes the input signal IR and provides the decoded user signal REM IN to the system controller. Pursuant to the appropriate user command, the four motor phase signals $\Phi 1$-$\Phi 4$ applied to the stepper motor 16 which accordingly steps through its positions as directed. The lead screw 20 is turned and the head 26 is positioned adjacent a desired track (such as the track A). Meanwhile, a signal M.EN provided to a speed control circuit 94 starts the disk drive motor 14. A tachometer circuit (not shown) monitors the motor speed and, when operating speed is attained, a signal M.LOCK signifies that the disk 10 is locked up at correct playback speed.

If the predetermined play interval passes without any input from the remote unit 40, then the disk drive motor 14 is deenergized by a signal M. STOP sent to the speed control circuit 94 from the system controller 30. No playback signal, consequently, is sensed by the head 26. At the same time, the signal BLANK is emitted by the controller 30 to the switch 84, toggling the switch so that the generated sync signal CS' forms the signal CSP sent to the encoder 86 (in lieu of the playback sync signal CS). The clamps 72a, 72b and 78 operate during the horizontal drive interval (from the generator 90) derived from the signal CSP (that is, the generated sync signal CS'). Thus the generated sync signal CSP occurs substantially at horizontal intervals, causing a stable picture to appear on the display 34. With the horizontal drive interval of each signal clamped to black by virtue of the clamps 72a, 72b and 78, and with no video signal coming from the field interlacer 68, the video portion of the clamped signals remains at a black level and provides a dark, blank picture on the display 34. The system controller, in the meantime, starts timing out the predetermined quiescent interval. If the quiescent interval passes without any user input from the remote unit 40, then the signal P.EN to the power supply 54 changes state and causes the power supply 54 to deenergize the section 54b producing the supply voltage V. This deenergizes the portion of the player devoted to signal processing and to the drive system. The system controller 30 remains powered from the supply section 54a, which provides the supply voltage V'.

The system controller 30 is shown in greater detail in FIG. 3. A microprocessor 100 (such as an Intel 8031 microprocessor) provides the central processing capability. Operating programs for the player are stored in a program memory (ROM) 102. Input data is received from the player directly by the microprocessor 100 and by an input buffer 104. Output data is provided to the player by a latch 106 (and could also be provided directly by the microprocessor 100). The four phase signals $\Phi 1$-$\Phi 4$ to the stepper motor 16 are generated by a driver 108 pursuant to instructions relayed from the microprocessor 100 through the latch 106. Addresses and data are moved back and forth through a bus structure 110. Memory instructions are accessed by addresses latched off the bus 110 by an address latch 112. The system controller components are each enabled by respective lines tied to the microprocessor 100. More particularly, the read and write enable lines RD and WR connect to the buffer 104 and the latch 106, respectively, for read and write operations. The address enable ALE and the program store enable line PSEN enable the address latch 112 and the memory 102, respectively, for external data memory access and external program memory fetch operations. Each component of the system controller 30 is continuously powered by the section 54a of the power supply 54, though the remainder of the player may be deenergized. A program of the type shown as a flow diagram in FIG. 4 is stored in the program memory 102 for powering parts of the player down (the drive motor 14) when in the quiescent state and all of the player but the system controller 30 and the receiver 44 when in shutdown.

The player as thus far described assumes that the drive motor 14 stops and the head 26 simply stays put in the quiescent state (e.g., by providing only two of the phase signals $\Phi 1$-$\Phi 4$). This makes it quite straightforward for the signal processing circuit 32 to resume in the first mode (FIG. 1) when the motor 14 is restarted, again showing the picture last seen on the display 34. However, it may be desirable to move the head to some parking position at the edge of the disk or to separate the head from the disk when the drive motor 14 and the player sit in the quiescent state. In such a case, the microprocesser 100, which is normally monitoring track locations anyhow, memorizes the location of the track A (i.e., track 1 or 2, etc.) in its internal (or external) memory. Then, if play is resumed within the quiescent interval (55 minutes) the microprocessor 100 will call for this track location and signal the stepper motor 16 to move the head 26 back to the track it was before playback was interrupted.

The preceding disclosure of the operation of the system controller 30 constitutes a sufficient specification of the operating software for putting the player in or out of the quiescent state and shutdown, and for accomplishing ancillary activities (starting and restarting a timing routine, producing the blanking signal, providing the stepper motor phase signals, controlling the disk drive motor, and the like). A programmer of ordinary skill can, from this specification, develop the program code to accomplish the stated operation without engaging in any undue experimentation or effort.

The invention has been described in detail with particular reference to a presently preferred embodiment, but it will be understood that variations and modifications can be effected within the spirit and scope of the invention. For example, while video apparatus according to the invention has been described in connection with a player, it may also be described in connection with a video still camera that utilizes a similar type of magnetic disk. Though the picture recording takes place during one passage of the camera's recording head over a circular track on the disk, the head will repetitively pass over the same circular area prior to taking the picture. According to the invention, a quiescent timer is set when the camera is turned on. Then, if the camera's shutter is not released in, say 5 minutes the camera enters a quiescent state to minimize disk wear (and to conserve energy, since the camera runs off battery power). The power-consuming part of the camera's electronics, as well as a disk motor, are inactivated. The recording head remains in the recording position and certain parts of the electronics (e.g., a microprocessor) remain powered in order to receive and process a "reactivate" signal. A partial depression of the shutter button restores the camera to full operation and the quiescent timer is reset (e.g., to 5 minutes). Alternatively, if the shutter button was not depressed for, say, 30 minutes, the quiescent state is terminated and the camera is completely inactivated. The recording head is retracted to a home position (relative the edge of the disk) and all of the electronics is shut off. The user must reactivate a main power switch to use the camera again. The camera therefore utilizes elements of the invention, that is, the automatic entry of a quiescent state after a first time interval and the automatic termination of the quiescent state and inactivation of the apparatus after a second time interval in the quiescent state. The camera also includes the important option of easily terminating the quiescent state (by instructions from a control unit, such as a shutter) and reactivating the apparatus anytime during the second interval.

What is claimed is:

1. Video apparatus for processing signals representing still pictures, said apparatus utilizing a magnetic medium on which the signals are recorded on recirculating tracks, said apparatus comprising:
    a magnetic head;
    means for positioning said magnetic head in contact with a selected track;
    a control unit for entering instructions to the apparatus regarding the processing of the signals;
    means for supporting the medium for rotation relative to said magnetic head so that said head repeatedly passes a selected track;
    means for generating a first power-down signal after a first predetermined interval has elapsed without any instructions from said control unit;
    means responsive to said first power-down signal for arresting said rotation of the medium;
    means for generating a second power-down signal after a further predetermined interval has elapsed following said first interval; and
    means responsive to said second power-down signal for inactivating the apparatus.

2. Video apparatus as claimed in claim 1 further comprising:
    means responsive to an instruction entered through said control unit during said further predetermined interval for resuming rotation of the medium;
    a timer for counting out said first interval; and
    means responsive to resumed rotation of the medium for resetting said timer to again start counting said first interval.

3. A video player for producing still pictures on a video display from signals recorded on circular tracks on a magnetic medium, said player comprising:
    a playback head for sensing the signals recorded on the medium;
    means for positioning said playback head in contact with a selected circular track;
    a control unit for entering user selections to the player regarding selected tracks;
    means for supporting the medium for rotation relative to said playback head so that said head repeatedly senses a selected track and accordingly generates a playback signal representative of a selected still picture;
    means for generating a power-down signal after a predetermined interval has elapsed without any selections from said control unit; and
    means responsive to said power-down signal for arresting said rotation of the medium and discontinuing generation of said playback signal.

4. A video player as claimed in claim 3 further comprising:
    controller means for receiving and processing instructions from said control unit;
    signal processing means responsive to said playback signal for generating a video signal suitable for displaying said selected still picture on the video display;
    a power supply for selectively energizing said controller means and said signal processing means;
    means responsive to the elapse of said predetermined interval for initiating a further predetermined interval;
    means for generating a second power-down signal after said further predetermined interval has elapsed; and
    means responsive to said second power-down signal for inactivating only the part of said power supply that energizes said signal processing means.

5. A video player for producing still pictures on a video display from signals recorded on circular tracks on a magnetic medium, said player comprising:
    a playback head for sensing the signals recorded on the medium;
    means for positioning said playback head in contact with a selected circular track;
    a control unit for entering user selections to the player, particularly selections directed to said head positioning means and indicating the identity of the selected track;
    drive means for moving the medium relative to said playback head so that said head repeatedly traverses a selected track and accordingly generates a playback signal representative of a selected still picture;
    signal processing means responsive in a first mode to said playback signal for generating a first video signal suitable for displaying said selected still picture on the video display and in a second mode for generating a second video signal suitable for displaying a predetermined image on the video display in lieu of said selected still picture;
    means for generating a power-down signal after a predetermined interval has elapsed without any selections from said control unit;
    means responsive to said power-down signal for inactivating said drive means, thereby arresting said relative movement, and for instructing said signal processing means to enter said second mode and route the second video signal to the display; and
    means responsive to a selection entered through said control unit for reactivating said drive means and for instructing said signal processing means to route the first video signal to the display.

6. A player as claimed in claim 5 further comprising:
    a receiver for detecting selections entered into the control unit;
    a power supply operative in a playback mode for energizing the player to effect playback and in an off mode for enabling the receiver to detect at least certain selections from said control unit;
    means responsive to said first power-down signal for generating a second power-down signal after a further predetermined interval has elapsed without any selections from said control unit; and
    means responsive to said second power-down signal for inactivating said power supply by placing it in said second mode.

7. A player as claimed in claim 5 further comprising:

a memory for storing prearranged instructions which are optionally provided in lieu of selections from said control unit;

means for automatically directing said positioning means to move from track to track according to said prearranged instructions; and said means for generating a power-down signal additionally generates said power-down signal after a predetermined interval has elapsed without receiving any prearranged instructions.

8. In a video disk player capable of cycling between a powered state and a semi-powered shutdown, the powered state one in which (a) a magnetic disk is supported for rotation in contact with a playback head for reproducing a playback signal from a track on the disk according to instructions from a control unit and (b) a video picture signal is generated from the playback signal for operating a display, the semi-powered shutdown being a condition in which the player is capable of processing at least some instructions from the control unit, particularly instructions to return the player to the powered state, the improvement of a quiescent state in which the player further comprises:

means for generating a power-down signal after a predetermined time interval has elapsed in the powered state without any instructions from said control unit;

means responsive to said power-down signal for initiating the quiescent state by arresting movement of the disk relative to the head and by replacing the video picture signal with a blanking signal for blanking the display; and means responsive to an instruction from the control unit during the quiescent state for resuming movement of the disk relative to the head and for returning the playback signal to the display.

9. A player as claimed in claim 8 further comprising means operative in the quiescent state for generating a second power-down signal after a further predetermined interval has elapsed without receiving any instructions from the control unit; and means responsive to said second power-down signal for putting the player into shutdown.

10. A player as claimed in claim 8 further including an automatic display facility responsive to prearranged instructions which are optionally provided in lieu of instructions from the operator control unit, said means for generating a power-down signal therefore generating said signal after either a predetermined interval has elapsed without receiving any instructions from the control unit or a predetermined interval has elapsed without receiving any prearranged instructions from the automatic display facility.

11. A player as claimed in claim 8 in which said means for generating a power-down signal comprises timing means for counting through said predetermined interval and for providing a timing signal at the end thereof, and means responsive to said timing signal for generating said power-down signal.

12. A video disk player for reproducing pictures on a video display from signals recorded on circular tracks on a flexible magnetic disk, said player comprising:

a playback head for sensing the signals recorded on the disk and providing a playback signal;

a disk drive for supporting the magnetic disk for rotation relative to said head, said disk drive including a drive motor for rapidly rotating the disk;

means for positioning the playback head in contact with a selected track on the disk;

means for generating a first synchronizing signal referenced to said playback signal and a second synchronizing signal from a free-running sync generator;

signal processing means responsive to said playback signal and to said first synchronizing signal for generating a video display signal for reproducing a picture on the display device;

a remote control unit for communicating user track selections to the player;

means for receiving said selections from said remote control unit and utilizing them to control said positioning means;

means for generating a power-down signal after a predetermined time interval has elapsed without any selections from said receiving means;

means responsive to said power-down signal for de-energizing said disk drive motor and for replacing said first synchronizing signal with said second synchronizing signal, said signal processing means then substituting a picture blanking signal in lieu of said display signal; and means responsive to a selection from said control unit for actuating said disk drive motor and regenerating the display signal.

13. A video disk player for reproducing still pictures on a video display from a composite color video signal recorded as one field per circular track on a flexible magnetic disk having many such tracks, said player comprising:

a playback head for sensing the composite signal recorded on the disk;

means for urging said playback head into physical contact with a selected track on the disk;

means for supporting the magnetic disk for rotation relative to said head, said supporting means including a drive motor for rotating the disk;

means for separating luminance and chrominance signals from the composite signal;

means for separating a synchronizing component from said luminance signal;

means for generating a substitute synchronizing component;

signal processing means responsive to said separated synchronizing component for generating a video display signal from input signals derived from said luminance and chrominance separating means;

a system controller for operating the player according to externally-generated instructions, said controller generating a power-down signal after a predetermined time interval has elapsed without receipt of said external instructions;

means responsive to said power-down signal for inactivating said drive motor and for routing said substitute synchronizing signal to said signal processing means in lieu of said separated synchronizing signal;

means responsive to said substitute synchronizing signal for clamping the input signals to said signal processing means to dc levels corresponding to a blank display; and means responsive to the receipt of an external instruction for reactivating said drive motor and for rerouting said separated synchronizing signal to said signal processing means.

14. Imaging apparatus for recording signals representing pictures on circular tracks on a magnetic medium, said apparatus comprising:
- a recording head for recording the signals on the medium;
- means for positioning said recording head in contact with a selected circular track;
- a control unit for entering user instructions to the apparatus;
- means for supporting the medium for rotation relative to said recording head so that said head repeatedly passes a selected track and, when instructed by said control unit, records the signals representative of a selected still picture;
- means for generating a first power-down signal after a first predetermined interval has elapsed without any instructions from said control unit;
- means responsive to said first power-down signal for arresting said rotation of the medium;
- means for generating a second power-down signal after a further predetermined interval has elapsed following said first interval; and
- means responsive to said second power-down signal for inactivating the apparatus.

15. Apparatus as claimed in claim 14 further comprising:
- means responsive to an instruction entered through said control unit during said further predetermined interval for resuming said rotation of the medium;
- a timer for counting out said first interval; and
- means responsive to resumed rotation of the medium for resetting said timer to again start counting said first interval.

* * * * *